(12) United States Patent
Jackson et al.

(10) Patent No.: US 7,343,340 B2
(45) Date of Patent: Mar. 11, 2008

(54) SYSTEM AND METHOD FOR DISTRIBUTING TRANSFORMER CAPACITY AMONG TRANSFORMER USERS

(76) Inventors: Edward Scott Jackson, 2684 Cross Timers Trail, Steamboat Springs, CO (US) 80488-0388; Mark B. Haas, 10186 Laurens Dr., NE., Bolivar, OH (US) 44612; Donald M. Kopf, 5537 Holmes Dr., NW., Canton, OH (US) 44718; Mark V. Casper, 5405 Laurel Dr., NW., Canton, OH (US) 44718

( * ) Notice: Subject to any disclaimer, the term of this patent is extended or adjusted under 35 U.S.C. 154(b) by 769 days.

(21) Appl. No.: 10/142,408

(22) Filed: May 9, 2002

(65) Prior Publication Data
US 2003/0009348 A1 Jan. 9, 2003

Related U.S. Application Data

(60) Provisional application No. 60/290,077, filed on May 10, 2001.

(51) Int. Cl.
*G06Q 40/00* (2006.01)
(52) U.S. Cl. .......................................................... 705/37
(58) Field of Classification Search .................... 705/1, 705/7, 8, 10, 22, 26, 27, 28, 37, 39, 40, 400, 705/412; 700/286, 291, 295
See application file for complete search history.

(56) References Cited

U.S. PATENT DOCUMENTS

| | | | | |
|---|---|---|---|---|
| 5,835,383 A | * | 11/1998 | Onizuka et al. | 700/297 |
| 5,884,286 A | * | 3/1999 | Daughtery, III | 705/36 R |
| 6,512,966 B2 | * | 1/2003 | Lof et al. | 700/291 |
| 6,868,397 B1 | * | 3/2005 | McCaslin | 705/28 |
| 2002/0095379 A1 | * | 7/2002 | Likourezos et al. | 705/40 |
| 2003/0018570 A1 | * | 1/2003 | McCabe et al. | 705/37 |
| 2003/0126060 A1 | * | 7/2003 | Lof et al. | 705/36 |
| 2003/0208365 A1 | * | 11/2003 | Avery et al. | 705/1 |
| 2005/0127680 A1 | * | 6/2005 | Lof et al. | 290/44 |

FOREIGN PATENT DOCUMENTS

JP     02000324701 A  * 11/2000

OTHER PUBLICATIONS

GE to Relocate a Power Delivery Business. May 1989. DIALOG File 148 03903345 PR Newswire, 0531NY008 pp. 1-2.*
Eby, Michael: Old Rules No Longer Apply. Jan. 1996. DIALOG File 15 01159332 98-08727 pp. 1-17.*

* cited by examiner

*Primary Examiner*—Igor N. Borissov
(74) *Attorney, Agent, or Firm*—Sand & Sebolt

(57) ABSTRACT

A method for utilizing transformer capacity allows multiple transformer users to have ordered access to the same backup transformer. When one of the users requires the use of a transformer, the users in line ahead of this user must exercise their rights to use the transformer or pass on their rights allowing the next user to decide whether or not to use the transformer. The method allows transformer owners to offer extra transformer capacity to those who desire backups while protecting their ownership interest and their need for the use of the backup. The method also provides those who need backup transformers a system to obtain access to the required backup without requiring them to purchase a new transformer or to wait for the transformer to be built.

28 Claims, 3 Drawing Sheets

How Many ☐

3 Phase ☐  1 Phase ☐   Oil ☐ Dry ☐

KVA [____]   DEG. C Rise [____]   Class [____]

Primary Voltage [____]   Delta Connected ☐   Y Connected ☐

Primary Taps [_____]

Secondary Voltage [____]   Delta Connected ☐   Y Connected ☐

Does the unit have a Load Tap Changer? ☐   Impedance [__] %

Was the unit working when removed from service? ☐

Did the unit fail while it was in service? ☐

Manufacturer: [_____]

Serial Number or Age: [_____]

FIG-2

How Many ☐     3 Phase ☐ 1 Phase ☐     Oil ☐ Dry ☐

KVA [____]     DEG. C Rise [____]     Class [____]

Primary Voltage [____]     Delta Connected ☐     Y Connected ☐

Secondary Voltage [____]     Delta Connected ☐     Y Connected ☐

Do you need a Load Tap Changer? ☐     Any Special Impedance? [____]%

FIG-3

SYSTEM AND METHOD FOR DISTRIBUTING TRANSFORMER CAPACITY AMONG TRANSFORMER USERS

CROSS REFERENCE TO RELATED APPLICATIONS

This application claims priority from now abandoned United States Provisional Patent Application No. 60/290,077 filed May 10, 2001; the disclosures of which are incorporated herein by reference.

BACKGROUND OF THE INVENTION

1. Technical Field

The present invention generally relates to a system and method for distributing electrical transformer capacity among different transformer users. More particularly, the system and method of the invention allows disassociated transformer users to utilize spare transformer capacity while insuring that the transformer owner retains access to the transformer when such access is needed by the owner. The invention provides a system and method for distributing options or rights of refusal to spare transformers among transformer users.

2. Background Information

Electrical power is one of today's most common power sources. Electrical power is used in essentially every home and business throughout the industrialized world. Electrical power generation facilities or power plants generate essentially all of the electrical power used in the industrialized world. Different types of power plants such as fossil fuel power plants, hydroelectric power plants, and nuclear power plants generate electric power. Regardless of how the electrical power is generated, each power plant must distribute the electrical power to the users of the electrical power. The distribution of electrical power requires the use of transformers.

Electrical power is distributed from power plants through distribution lines. As power is transmitted through the lines, the lines resist the electrical current and generate heat. The resistance decreases the amount of electrical power transmitted through the lines. Power companies desire to minimize the power lost in the power lines. To minimize power losses, power plants transmit electrical power at high voltages which decreases the amount of current required to distribute the electrical power. Power plants use step-up transformers to increase the voltage of the power generated by their generators. After the power has reached its destination, a step-down transformer is used to reduce the voltage to a usable level. The destination may be a local power grid, an individual company, or a specific device. Each of these destinations may require a different voltage and a specifically-configured transformer.

In the United States and Canada, there are thousands of electrical power generation facilities that are typically called electric utilities. Over the past hundred years, most electrical utilities have been regulated by a government that prevented the utility from competing against other electrical utilities for customers. As such, each electrical utility could easily pass on all costs to the consumers and each electrical utility could afford to purchase a backup transformer for each transformer in its distribution system.

Recent utility company deregulation has caused utility companies to review the cost of generating and distributing power to consumers because each utility company is now competing against other utility companies for customers. Deregulated utility companies thus cannot easily pass on a cost of each expenditure directly to the consumer. Electrical utilities are also reviewing their assets to determine how to generate income in addition to the income generated by selling electrical power.

In the newly deregulated power industry, each electrical utility must have a backup transformer that is immediately available for each key transformer in its distribution system. Immediate access to a backup transformer is essential because a new transformer can take months to be built, delivered, and installed. In the age of deregulation, the electrical utility must purchase power from a competitor if a key transformer goes down. The competitor will sell the electrical power to the crippled electrical utility at the highest possible rate. A single transformer failure can substantially reduce or eliminate a utility's profit. Backup transformers are thus financially essential. Backup transformers are also required by insurers. In addition to typical backups, some insurers require redundant backup plans.

Although backup transformers are essential, the actual backups are rarely used because only a small fraction of transformers actually fail from year to year. Furthermore, some transformer failures are immediate and unexpected while others are slow and can be anticipated. A problem in the industry is that no one can accurately forecast if a transformer failure will be immediate or slow. The same warning signs are generated by transformers that fail immediately as transformers that fail slowly. Thus, it is inefficient for an electrical utility to purchase a backup transformer when the backup transformer may sit unused for years while the primary transformer continues to function. On the other hand, the electrical utility cannot wait for the transformer to show signs of failure due to the extraordinary expense incurred if the transformer fails suddenly. The problem of replacing failed transformers is especially unique because there may only be one or two replacement transformers for a particular application in the world and the replacement transformer may have to be specially built by a transformer manufacturer with a long lead time.

In the past, electrical utilities and other transformer users (such as large manufacturing facilities) have purchased and stored large numbers of transformers for backup. Today's deregulated electrical utility companies cannot continue using this backup method and desire a new system for backing up their key transformers while allowing the users to derive income from their existing backup transformers.

BRIEF SUMMARY OF THE INVENTION

In view of the foregoing, the invention provides a method for utilizing transformer capacity by allowing multiple transformer users to have ordered access to the same backup transformer. When one of the users requires the use of a transformer, the users in line ahead of this user must exercise their rights to use the transformer or pass on their rights allowing the next user to decide whether or not to use the transformer. The method provides a mechanism for spare transformer owners to offer their extra transformer capacity to those who desire backups. The method allows the transformer owners to offer their extra transformer capacity while protecting their ownership interest and their need for the use of the backup. The method also provides those who need backup transformers a system to obtain access to the required backup without requiring them to purchase a new transformer or to wait for the transformer to be built. The system allows those who need backup transformers to obtain the required backup without paying for an entire transformer. The system and method of the invention thus reduces inefficiencies that presently exist in the marketplace.

BRIEF DESCRIPTION OF THE SEVERAL VIEWS OF THE DRAWINGS

FIG. 2 is a view of the information required when a user wishes to list a transformer with the system.

FIG. 3 is a view of the information required by a user who wishes to obtain rights to a backup transformer.

Similar numbers refer to similar parts throughout the specification.

DETAILED DESCRIPTION OF THE INVENTION

Figure 1:
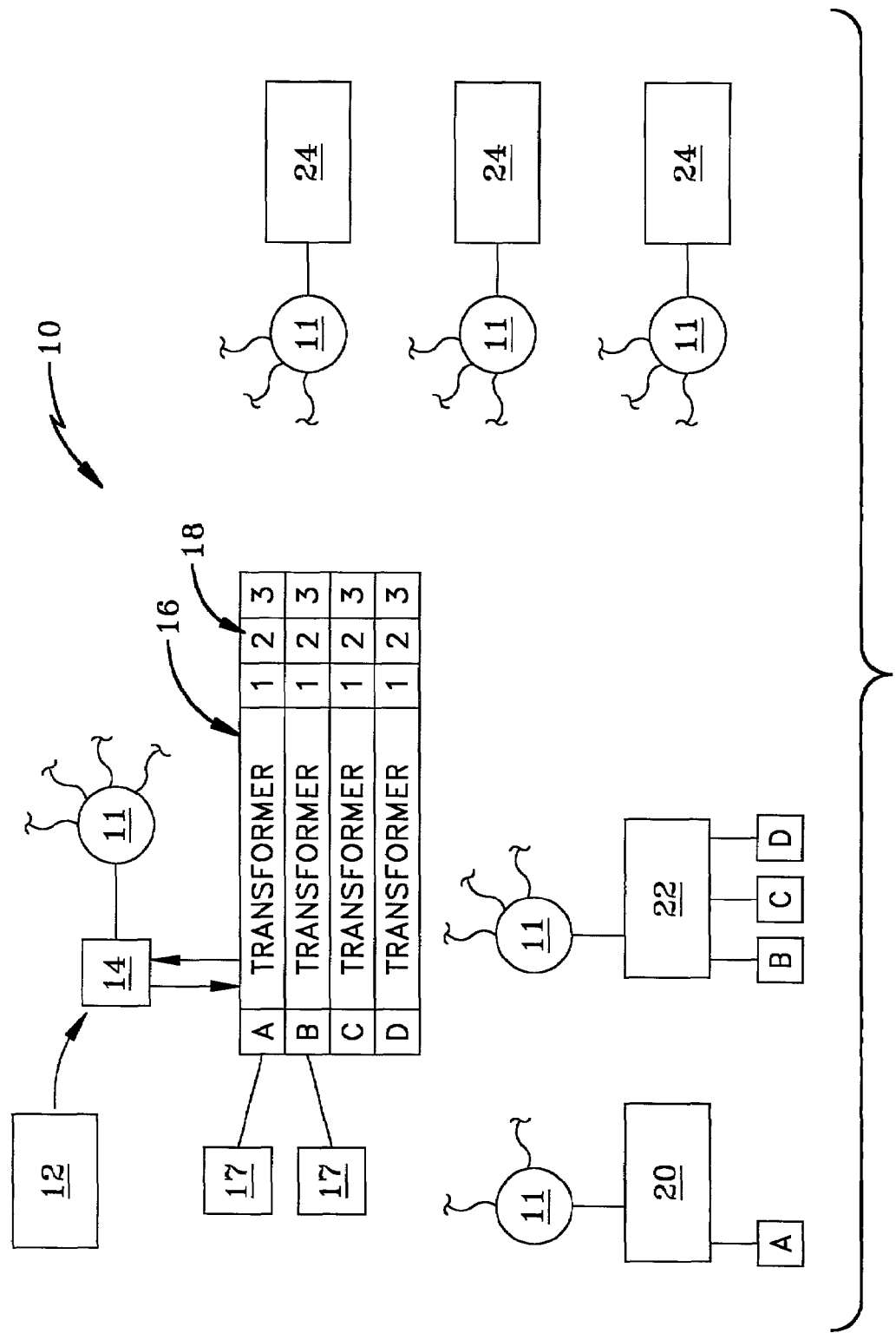
FIG. 1 is a schematic view of the system of the invention.

The system of the present invention is depicted schematically in FIG. 1 and is indicated generally by the numeral 10. System 10 may be operated and implemented over a wide area computer network 11 wherein each user may connect with a central computer that is maintained by a system administrator 12. Of course, system 10 may be implemented without such a network by transmitting various information to all users via mail, phone, or facsimile. However, a network has the advantage that it allows all users 24 hour access to the information and allows users to view updated information instantaneously. In the preferred embodiment of the invention, system 10 uses the Internet to allow the various users of system 10 to communicate with each other. Administrator 12 maintains the information used by system 10 on software that resides on a server computer 14. The software provides a matrix 16 of information used by the users of system 10.

Administrator 12 who is responsible for running server computer 14, updating the matrix 16 listing available transformers and various options, and for distributing the transformers to the users of system 10. Administrator 12 also may be responsible for the bookkeeping of system 10. In one embodiment of the invention, administrator 12 may be responsible for delivering or for arranging the delivery of a transformer to the user who needs the transformer. Administrator 12 may also determine the prices of the rights and the fees for using system 10.

In one embodiment of the invention, system users are limited by membership to system 10. In order to become a member and have access to system 10, a user must pay a membership fee to administrator 12. The membership fee would be periodic (such as yearly or monthly) and would require the user to supply information about the user to administrator 12 so that administrator 12 could at least perform proper bookkeeping activities. In other embodiments of the invention, system 10 is made available to the public. In this situation, a discount may be given to members. In another embodiment, the members of system 10 may review new listings before new listings are made available to the public.

System 10 includes a matrix 16 that lists a variety of different transformers (transformer A, transformer B, transformer C, transformer D, etc.) that are available for sale, lease, and options. Matrix 16 includes an overall list of general information about each transformer. Detailed information 17 may be linked to each listing so that a user may determine the exact specifics of a transformer listed on matrix 16. Matrix 16 may also list which user currently owns the transformer and which rights 18 are available to other users. Rights 18 may include such information as the costs of subsequent options as well as the particular rights associated with each current option holder for a specific transformer. In another embodiment, matrix 16 only lists the transformers and the users must contact administrator 12 to determine what rights are available. Additionally, a purchase system is in place to allow for the transfer of funds and in one embodiment the funds are transferred directly to administrator 12 and in another system a portion of each option fund is removed and transferred to administrator 12 with the remaining funds being transferred into a held escrow account so that funds are guaranteed to be returned from the escrow account should a earlier option holder exercise their option and subsequent exercise holders moneys are returned.

System 10 can only function when transformer owners list their transformers with system 10. A first type of owner is a typical transformer user 20 who owns idle backup transformers. Another type of transformer owner 22 is one who purchases commonly-used transformers and lists them with system 10 in order to profit from the ownership of the transformers. Traditional owner 20 will only list his backup transformer with system 10 if he retains his right to use the backup transformer when he needs it—otherwise, owner 20 would not risk losing his backup. System 10 allows owner 20 to protect his backup while generating income by selling options in the idle backup time of the transformer. With respect to owner 22, he does not need to protect a backup and does not need to retain any rights in the transformer.

System 10 is initiated when a transformer owner 20 or 22 lists at least one transformer on matrix 16. For the purposes of providing an example, owner 20 lists Transformer A and owner 22 lists Transformer B. An owner lists the transformer by contacting administrator 12 and providing information such as the information depicted in FIG. 2. Once this information is provided, the transformer will appear on matrix 16 for the users of system 10.

We first examine how system 10 functions with Transformer A listed by owner 20. Owner 20 may list Transformer A for sale or for lease. Owner 20 retains the first right of refusal when owner 20 lists the Transformer A. The first right of refusal gives owner 20 the option of keeping Transformer A if another system user wishes to purchase or lease Transformer A. The right of first refusal may also allow owner 20 to force the return of Transformer A when another user is leasing Transformer A. Such a right protects owner 20's backup requirements and gives him an incentive to list Transformer A.

In this situation, other users 24 interested in Transformer A will purchase ordered rights of refusal (second, third, fourth, etc.). Users 24 may request information about the transformers available on matrix 16 by submitting the information depicted in FIG. 3. If a transformer is not already listed, administrator 12 may obtain the requested transformer for system 10. Each user pays administrator 12 a monthly fee for owning the right of refusal. The fee for the second right may be higher than the third right and the fee for the third right may be higher then the fourth right, etc. Administrator 12 holds a portion of the money in an interest-bearing account until one of the users exercises an option on Transformer A. Another portion of the money is paid to owner 20 for listing Transformer A. This payment provides the main incentive for owner 20 to list Transformer A with system 10. As discussed above, Transformer A would be a backup transformer that may never be placed into service or may not be placed into service for years. System 10 thus provides a method that allows owner 20 to generate income from an otherwise idle asset.

If the owner of the third right of refusal indicates that he wishes to purchase or lease Transformer A, the owner of the first right of refusal must decide whether to keep Transformer A or pass on his right. If the first right of refusal is exercised, the money paid by the users for the second, third, fourth, etc. rights of refusal is returned without interest and less an administrative fee. The fee and the interest is retained by administrator 12. A percentage of the money paid to owner 20 for the options must also be returned.

If the owner of the first right does not exercise his option, the holder of the second right of refusal is given the opportunity to exercise his right to purchase or lease Transformer A (depending on the type of option he purchased). If the owner of the second right exercises the right, the lower right holders (third, fourth etc.) may get their payments back. If the second right owner passes, he loses his fees and Transformer A is controlled by the third right holder who initiated the process. All right holders behind the third holder then receive their money back.

In the case of a sale, owner 20 will lose his right to Transformer A if he does not exercise his right of refusal. In the case of a lease, the first right of refusal may be designed to allow owner 20 to lease Transformer A to one of the other users while retaining a right to demand the return of Transformer A upon demand (subject to reasonable notice) if owner 20 requires Transformer A for his power system. This type of right would encourage transformer owners to list their backup transformers for lease with system 10.

We next examine how system 10 functions with Transformer B listed by owner 22. In some situations, owner 22 may be the same entity as administrator 12. Owner 22 would be an entity with spare transformers that he can part with or an entity that purchases commonly-used transformers with the intention of profiting from the sale of the rights of refusal, the leasing of the transformers, or the outright sale of the transformers. Owner 22 may thus purchase a group of commonly-used transformers (Transformers B, C, and D) and price the options to pay off the purchase price and create an income stream based on its ownership interest.

Owner 22 may list Transformer B for sale or for lease. Owner 22 would not retain a right of first refusal because owner 22 has no need for Transformer B. Owner 22 thus offers the right of first refusal for sale to the other users of system 10.

In this situation, other users interested in Transformer B will purchase ordered rights of refusal (first, second, third, fourth, etc.). Each user pays administrator 12 a monthly fee for owning the right of refusal. The fee for the first right may be higher than the second right and the fee for the second right may be higher then the third right, etc. Administrator 12 holds a portion of the money in an interest-bearing account until one of the users exercises an option on Transformer B. Another portion of the money is paid to owner 22 for listing Transformer B. If the owner of the third right of refusal indicates that he wishes to purchase or lease Transformer B, the owner of the first right of refusal must decide whether to purchase or lease Transformer B or pass on his right. If the first right of refusal is exercised, the money paid by the users for the second, third, fourth, etc. rights of refusal is returned without interest and less an administrative fee. The administrative fee and the interest is retained by administrator 12.

If the owner of the first right does not exercise his option, the holder of the second right of refusal is given the opportunity to exercise his right to purchase or lease Transformer B. In this situation, the owner of the first right forfeits his fees to owner 22 and administrator 12. If the owner of the second right exercises the right, the lower right holders get their payments back. If the second right owner passes, he loses his fees and Transformer B is controlled by the third right holder who initiated the process. All right holders behind the third holder then receive their money back (less interest and administrative fees).

With respect to either owner 20 or 22 described above, administrator 12 may apply a portion of the option fees against a lease or sale price eventually paid by the entity who exercises his right.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method for distributing excess of transformer capacity comprising the steps of:
    listing an excess of transformer capacity of a transformer owned by a first owner, the listing offering ownership rights in the excess of transformer capacity;
    selling ordered options for the listed excess of transformer capacity;
    allowing one of the option holders to trigger the exercise of the options;
    returning at least part of each of the option fees of all lower option holders when a higher option holder exercises his option; and
    keeping the option fees of the option holder who exercises his option.

2. The method of claim 1, further comprising the step of keeping the option fees of any option holder who passes on his option.

3. The method of claim 1, further comprising the step of giving the owner the right to demand return of the excess of transformer capacity when the excess of transformer capacity is leased to another.

4. The method of claim 1, wherein the ordered options are purchase options.

5. The method of claim 1, wherein the ordered options are lease options.

6. The method of claim 1, wherein the ordered options are both purchase and lease options.

7. The method of claim 1, further comprising the step of investing the option fees in an interest-bearing account and keeping the interest earned on the option fees when the option fee is return to an option holder.

8. The method of claim 1, further comprising the step of deducting an administrative fee from the option fee.

9. The method of claim 1, wherein the step of listing an excess transformer owned by a first owner is performed on a matrix on a computer that is accessible over a network.

10. The method of claim 9, wherein access to the matrix is given only to a group of members.

11. A system for distributing transformer capacity comprising:
    at least one transformer having a capacity that is available for use by someone other than the owner of the at least one transformer;
    a computer configured to generate a list of the at least one transformer, said list being accessible by those that would like to buy ordered options for ownership rights in the transformer capacity;

an access system configured to allow provide access for viewing the list by others;

a purchase system configured to allow the purchase of ordered options for the capacity of any transformer on the list by others.

12. The system of claim 11 in which the access system includes a matrix of available transformers viewable over a network.

13. The system of claim 12 in which the network is the Internet.

14. The system of claim 12 in which the list further includes the ownership interest of other option holders for a given transformer on the list.

15. The system as defined in claim 12 in which the list further includes the cost of subsequent options for a given transformer.

16. The system as defined in claim 12 in which the purchase system includes a bank account for receiving money for the sale of ordered options of transformers on said list.

17. The system as defined in claim 16 in which an escrow account is used for receiving money from later options after the first option to assure the return of the money to subsequent purchasers.

18. The method of claim 1 wherein the step of selling includes the step of selling ordered options for the listed excess of transformer capacity to respective transformer users as insurance against loss of electric power generation capability due to failure of a transformer used by one the transformer users.

19. The method of claim 1 further including the step of providing exclusive use of the excess transformer to the holder of the option exercised.

20. The method of claim 1 wherein the step of selling includes the step of selling ordered options for the listed excess of transformer capacity exclusively to one of a group consisting of (a) producers of electrical power; (b) distributors of electrical power; and (c) producers and distributors of electrical power.

21. The method of claim 1 wherein the step of listing includes the step of listing at least one of a group consisting of:
(a) whether the transformer is a three phase or one phase transformer;
(b) whether the transformer is oil type or dry type;
(c) kilovolt ampere rating (KVA) of the transformer;
(d) temperature rise of the transformer;
(e) class of the transformer;
(f) primary tap specifics;
(g) primary voltage rating of the transformer and whether delta or Y connected;
(h) secondary voltage rating of the transformer and whether delta or Y connected;
(j) whether the transformer has a load tap changer;
(k) impedance of the transformer;
(l) whether the transformer was working when removed from service;
(m) whether the transformer failed while in service;
(n) manufacturer of the transformer;
(o) serial number of the transformer; and
(p) age of the transformer.

22. The method of claim 1 further including the step of transferring possession of the excess of transformer capacity to the option holder who exercises his option.

23. The method of claim 1 further including the step of delivering the excess of transformer capacity to the option holder who exercised the option.

24. The system of claim 11 wherein the access system is a limited access system accessible only to producers of electrical power.

25. The system of claim 11 wherein the purchase system is a limited access purchase system accessible only to producers of electrical power.

26. The system of claim 11 wherein the list includes specific information about the excess of transformer capacity for assisting a potential purchaser of an ordered option for the excess of transformer capacity in determining whether the transformer is suitable for the purposes of the potential purchaser.

27. The system of claim 26 wherein the specific information includes at least one of a group consisting of:
(a) whether the transformer is a three phase or one phase transformer;
(b) whether the transformer is oil type or dry type;
(c) kilovolt ampere rating. (KVA) of the transformer;
(d) temperature rise of the transformer;
(e) class of the transformer;
(f) primary tap specifics;
(g) primary voltage rating of the transformer and whether delta or Y connected;
(h) secondary voltage rating of the transformer and whether delta or Y connected;
(j) whether the transformer has a load tap changer;
(k) impedance of the transformer;
(l) whether the transformer was working when removed from service;
(m) whether the transformer failed while in service;
(n) manufacturer of the transformer;
(o) serial number of the transformer; and
(p) age of the transformer.

28. The method of claim 1 further comprising the step of selling the excess of transformer capacity to the option holder who exercises his option.

* * * * *